(12) United States Patent
Ramanna et al.

(10) Patent No.: US 7,787,421 B2
(45) Date of Patent: *Aug. 31, 2010

(54) METHOD AND SYSTEM FOR INTER-TECHNOLOGY ACTIVE HANDOFF OF A HYBRID COMMUNICATION DEVICE

(75) Inventors: Shreesha Ramanna, Vernon Hills, IL (US); Vivek G. Naik, Deerfield, IL (US); Dan Zhang, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/272,853

(22) Filed: Nov. 14, 2005

(65) Prior Publication Data

US 2006/0109817 A1 May 25, 2006

Related U.S. Application Data

(62) Division of application No. 11/272,934, filed on Nov. 14, 2005.

(60) Provisional application No. 60/629,929, filed on Nov. 22, 2004.

(51) Int. Cl.
H04W 4/00 (2009.01)
(52) U.S. Cl. ............... 370/331; 370/332; 370/333; 370/334; 455/436; 455/437; 455/438; 455/439; 455/440; 455/441; 455/442; 455/443; 455/444
(58) Field of Classification Search ......... 455/436–444; 370/331–334
See application file for complete search history.

(56) References Cited

U.S. PATENT DOCUMENTS

| 6,212,173 | B1 * | 4/2001 | Lindsay et al. ............... 370/331 |
| 6,615,044 | B2 | 9/2003 | Tigerstedt et al. |
| 6,879,580 | B1 * | 4/2005 | Djuphammar et al. ...... 370/352 |
| 2003/0002525 | A1 | 1/2003 | Grilli et al. |
| 2003/0087653 | A1 | 5/2003 | Leung et al. |
| 2003/0193911 | A1 * | 10/2003 | Zhao et al. .................. 370/331 |
| 2003/0211848 | A1 | 11/2003 | Rajkotia et al. |
| 2006/0039310 | A1 | 2/2006 | Julka et al. |
| 2006/0109818 | A1 * | 5/2006 | Ramanna et al. ............ 370/331 |
| 2006/0126564 | A1 * | 6/2006 | Ramanna et al. ............ 370/331 |

FOREIGN PATENT DOCUMENTS

KR 1020010045610 A 6/2001

* cited by examiner

Primary Examiner—Nghi H Ly
Assistant Examiner—Amancio Gonzalez
(74) Attorney, Agent, or Firm—Steven A. May

(57) ABSTRACT

A communication system provides for a handoff of a hybrid mobile station (MS) between a legacy network implementing a non-high rate packet data (non-HRPD) communication technology and a network implementing a high rate packet data (HRPD) communication technology. In one embodiment, the legacy network receives a handoff trigger and redirects the MS to the HRPD network. In other embodiments, the legacy network (or HRPD network) receives a handoff trigger, obtains an allocation of HRPD network (or non-HRPD network) resources from the HRPD network (or non-HRPD network), and informs the MS of the allocated HRPD network (or non-HRPD network) resources. Subsequent to the establishment by the HRPD network (or non-HRPD network) of a traffic channel with the MS, the non-HRPD network (or HRPD network) releases non-HRPD network (or HRPD network) RF resources associated with the MS. In still other embodiments, the handoffs may be controlled by a Mobile Switching Center.

8 Claims, 7 Drawing Sheets

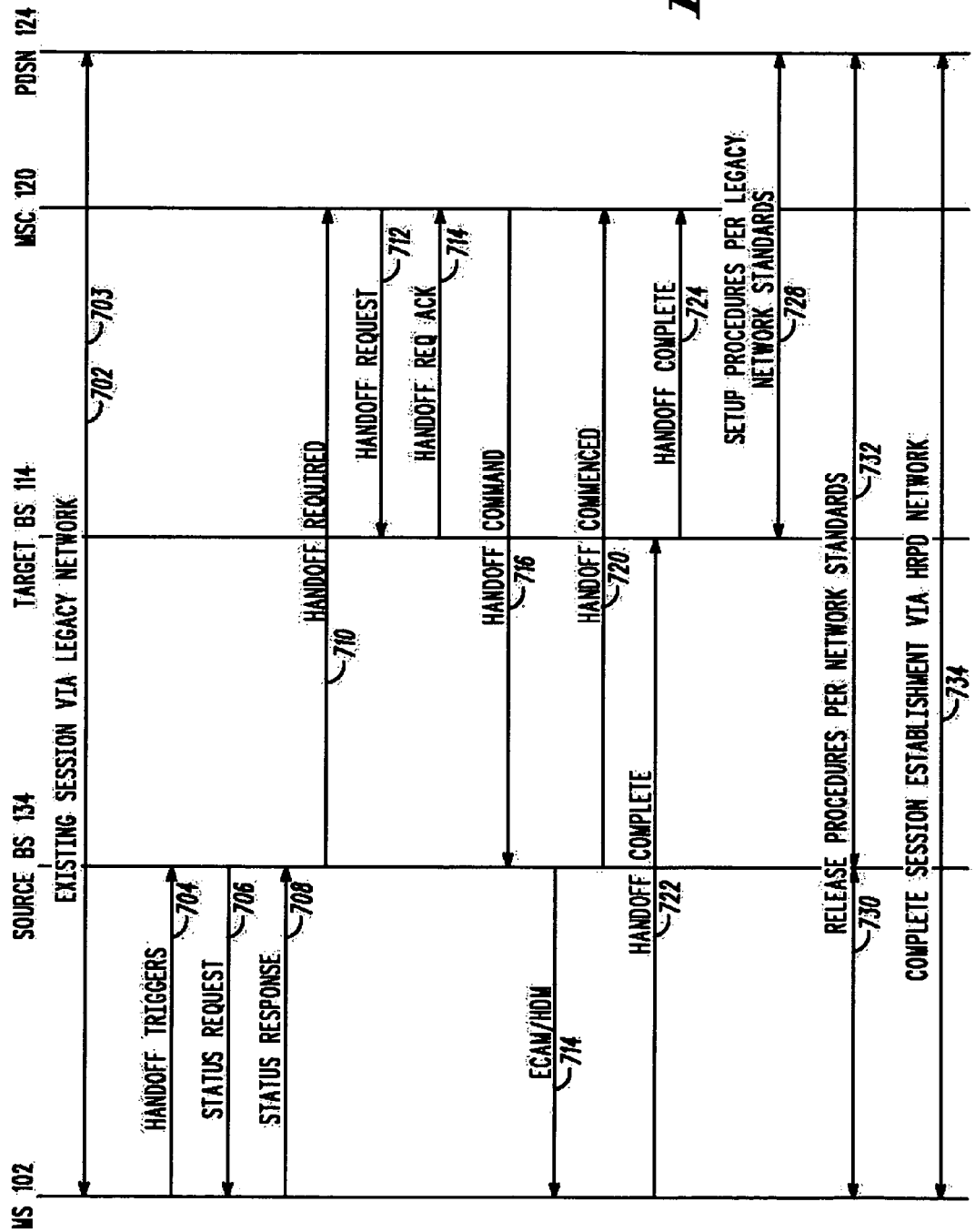

METHOD AND SYSTEM FOR INTER-TECHNOLOGY ACTIVE HANDOFF OF A HYBRID COMMUNICATION DEVICE

CROSS REFERENCE TO RELATED APPLICATION

The present application claims priority from provisional application Ser. No. 60/629,929, entitled "METHOD AND SYSTEM FOR INTER-TECHNOLOGY ACTIVE HANDOFF OF A HYBRID COMMUNICATION DEVICE," filed Nov. 22, 2004, which is commonly owned and incorporated herein by reference in its entirety, and is a divisional application of application Ser. No. 11/272,934, filed on the same date as the present application.

FIELD OF THE INVENTION

The present invention relates generally to wireless communication systems, and more specifically to handoff of a hybrid communication device between a High Rate Packet Data (HRPD) cellular communication system and a second generation (2G) cellular communication system.

BACKGROUND OF THE INVENTION

The evolution of cellular communications has resulted in a proliferation of networks of different technologies and corresponding different air interfaces. As a result, during the course of a single call, a wireless mobile station may roam among multiple networks, wherein each such network implements a different technology than the other networks of the multiple networks. Among the different network technologies are high rate packet data (HRPD) Code Division Multiple Access (CDMA) technologies, such as CDMA 2000 1XEV-DO (1X Evolution Data Optimized) or packet switched CDMA 1XRTT (1X Radio Transmission Technology), that are capable of providing high rate packet data communication services, and conventional, or legacy, CDMA cellular communication technologies, such as a CDMA 1X.

As the mobile station roams among a HRPD CDMA communication network and a legacy CDMA communication network, it may be beneficial to system performance to handoff the mobile station from the former network to the latter network or from the latter network to the former network. For example, the channel conditions associated one such network may be more favorable than the channel conditions associated with the other such network due to such factors as fading, adjacent and co-channel interference, and available power at a serving base station (BS) or radio access network (RAN). By way of another example, an operator of both a packet switched CDMA network and a circuit switched CDMA network may desire to move the mobile station from one such network and to the other such network for purposes of system loading.

Currently, the only defined method for executing a handoff between a HRPD CDMA network and a legacy CDMA network is an execution of a dormant hard handoff, wherein a mobile station must go dormant and drop a radio resource of a network of a first CDMA technology and then acquire a radio resource of a network of a second CDMA technology. A result is a brief period of time during which the mobile station is not actively engaged in a communication session with either network. Further, when executing a dormant hard handoff there is no linkage between the two networks as the mobile station must drop the first network and acquire the second network without any assistance from the BS or RAN of either network. As a result, voice/data traffic may be lost during the handoff, resulting in poor system performance and efficiency and disgruntled end users.

Therefore, a need exists for a method and apparatus for an active hard handoff of a communication session between a legacy CDMA network and a high rate packet data CDMA 2000 network that minimizes an amount of time that a mobile station is not actively engaged in a communication session with either network during a handoff.

BRIEF DESCRIPTION OF THE DRAWINGS

FIG. 7 is a signal flow diagram illustrating a handoff of a communication session from a high rate packet data network of FIG. 1 to a legacy network of FIG. 1 in accordance with other embodiments of the present invention.

DETAILED DESCRIPTION OF THE INVENTION

Figure 1:
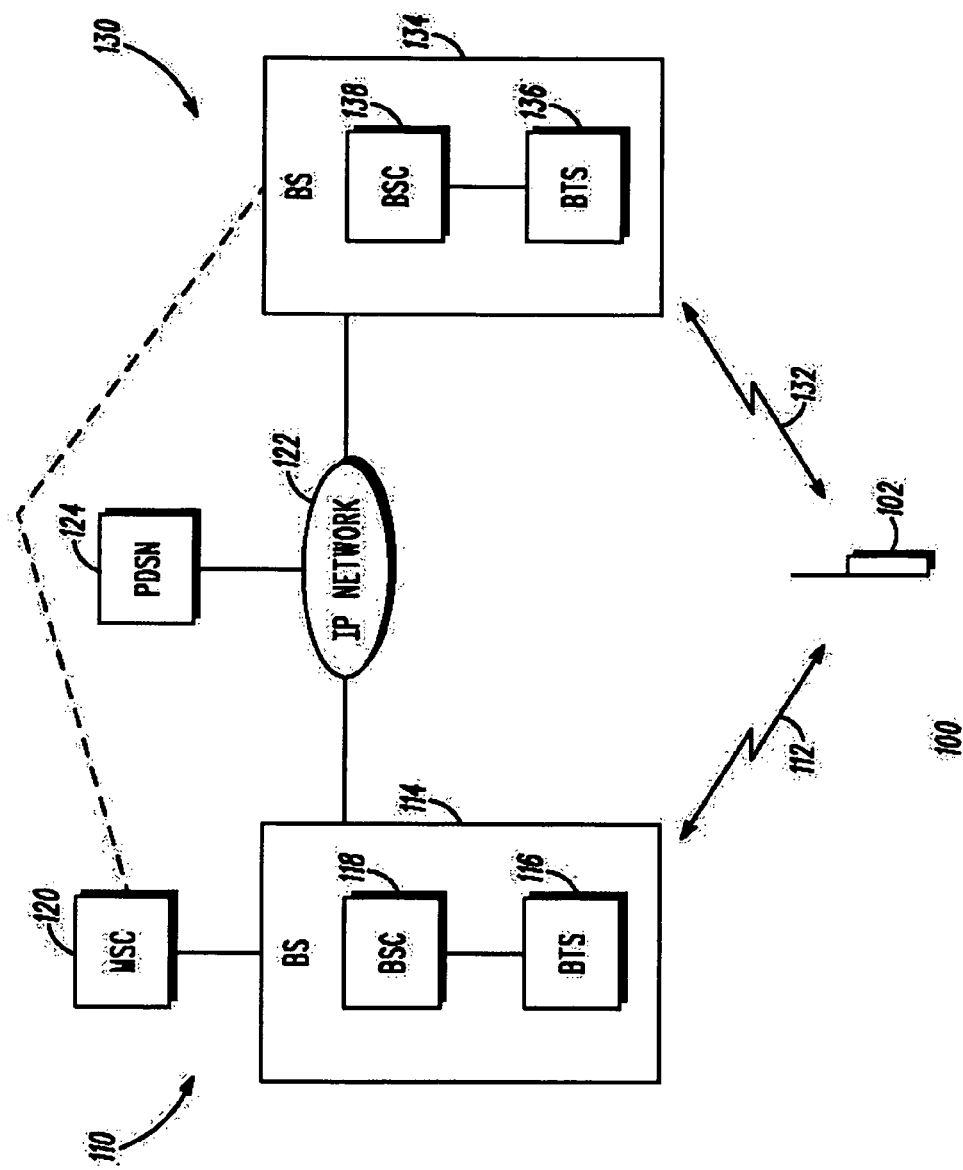
FIG. 1 is a block diagram of a wireless communication system in accordance with an embodiment of the present invention.

To address the need that exists for a method and apparatus for an active hard handoff of a communication session between a legacy CDMA 2000 network and a high rate packet data CDMA 2000 network that minimizes an amount of time that a mobile station is not actively engaged in a communication session with either network during a handoff, a communication system is provided that provides for a handoff of a hybrid mobile station (MS) between a legacy network implementing a non-high rate packet data (non-HRPD) communication technology and a network implementing a high rate packet data (HRPD) communication technology. With respect to a handoff of the MS from the non-HRPD network to the HRPD network, in one embodiment of the present invention the non-HRPD network receives a handoff trigger and redirects the MS to the HRPD network. In another embodiment of the present invention, in response to receiving the handoff trigger, the non-HRPD network obtains an allocation of HRPD network resources from the HRPD network, and informs the MS of the allocated HRPD network resources. Subsequent to the establishment by the HRPD network of a traffic channel with the MS, the non-HRPD network releases non-HRPD network RF resources associated with the MS.

With respect to a handoff of the MS from the HRPD network to the non-HRPD network, in yet another embodiment of the present invention the HRPD network receives a handoff trigger, obtains an allocation of non-HRPD network resources from the non-HRPD network, and informs the MS of the allocated non-HRPD network resources. Subsequent to the establishment by the non-HRPD network of a traffic channel with the MS, the HRPD network releases HRPD network radio frequency (RF) resources associated with the MS. In still other embodiments of the present invention, the handoffs may be controlled by a Mobile Switching Center.

Generally, an embodiment of the present invention encompasses a method for a handoff of a hybrid MS from a network implementing a non-HRPD communication technology to a network implementing an HRPD communication technology. The method includes conveying forward link bearer traffic to, and receiving reverse link bearer traffic from, the MS via RF resources associated with the non-HRPD network. The method further includes receiving, by the non-HRPD network, a handoff trigger, in response to receiving the handoff trigger, requesting, by the non-HRPD network of the HRPD network, an allocation of HRPD network resources, in response to the request, receiving by the non-HRPD network from the HRPD network, an allocation of HRPD network resources, and informing the MS, by the non-HRPD network, of the allocated HRPD network resources. The method further includes establishing, by the HRPD network, a traffic channel with the MS based on the allocated HRPD network resources and, subsequent to the establishment by the HRPD network of a traffic channel with the MS, releasing, by the non-HRPD network, the RF resources of the non-HRPD network.

Another embodiment of the present invention encompasses a method for a handoff of a hybrid MS from a network implementing a non-HRPD communication technology to a network implementing an HRPD communication technology. The method includes conveying forward link bearer traffic to, and receiving reverse link bearer traffic from, the MS via RF resources associated with the non-HRPD network. The method further includes receiving, by the non-HRPD network, a handoff trigger, in response to receiving the handoff trigger, conveying a message to the MS that redirects the MS to the HRPD network, receiving, by the HRPD network from the MS and in response to the conveyance of the redirection message, a connection request, and in response to receiving the connection request, conveying, by HRPD network to the MS, an allocation of HRPD network resources. The method further includes establishing, by the HRPD network, a traffic channel with the MS based on the allocated HRPD network resources and subsequent to the establishment by the HRPD network of a traffic channel with the MS, releasing, by the non-HRPD network, the RF resources of the non-HRPD network.

Yet another embodiment of the present invention encompasses a method for a handoff of a hybrid MS from a network comprising a Mobile Switching Center (MSC) and implementing a non-HRPD communication technology to a network implementing an HRPD communication technology. The method includes conveying forward link bearer traffic to, and receiving reverse link bearer traffic from, the MS via RF resources associated with the non-HRPD network, receiving, by the non-HRPD network, a handoff trigger, and in response to receiving the handoff trigger, conveying a message to the MSC requesting a handoff of the MS. The method further includes, in response to receiving the request, obtaining, by the MSC, an allocation of RF resources by the HRPD network and informing the MS, by the non-HRPD network, of the RF resources allocated by the HRPD network. The method further includes establishing, by the HRPD network, a traffic channel with the MS based on the RF resources allocated by the HRPD network; and subsequent to the establishment by the HRPD network of a traffic channel with the MS, releasing, by the non-HRPD network, the RF resources of the non-HRPD network.

Still another embodiment of the present invention encompasses a method for a handoff of a hybrid MS from a network implementing an HRPD communication technology to a network implementing a non-HRPD communication technology. The method includes conveying forward link bearer traffic to, and receiving reverse link bearer traffic from, the MS via RF resources associated with the HRPD network. The method further includes receiving, by the HRPD network, a handoff trigger, in response to receiving the handoff trigger, requesting, by the HRPD network of the non-HRPD network, an allocation of non-HRPD network resources, in response to the request, receiving, by the HRPD network from the non-HRPD network, an allocation of non-HRPD network resources, and informing the MS, by the HRPD network, of the allocated non-HRPD network resources. The method further includes establishing, by the non-HRPD network, a traffic channel with the MS based on the allocated non-HRPD network resources and subsequent to the establishment by the non-HRPD network of a traffic channel with the MS, releasing, by the HRPD network, the RF resources of the HRPD network.

Yet another embodiment of the present invention encompasses a method for a handoff of a hybrid MS from a network implementing an HRPD communication technology to a network comprising an MSC and implementing a non-HRPD communication technology. The method includes conveying forward link bearer traffic to, and receiving reverse link bearer traffic from, the MS via radio frequency (RF) resources associated with the HRPD network, receiving, by the HRPD network, a handoff trigger, and in response to receiving the handoff trigger, conveying a message to the MSC requesting a handoff of the MS. The method further includes, in response to receiving the request, obtaining, by the MSC, an allocation of RF resources by the non-HRPD network, informing the HRPD network, by the MSC, of the RF resources allocated by the non-HRPD network, and informing the MS, by the HRPD network, of the RF resources allocated by the non-HRPD network. The method further includes establishing, by the non-HRPD network, a traffic channel with the MS based on the RF resources allocated by the non-HRPD network and subsequent to the establishment by the non-HRPD network of a traffic channel with the MS, releasing, by the HRPD network, the RF resources of the HRPD network.

Still another embodiment of the present invention encompasses a system for a handoff of a hybrid MS from a network implementing a non-HRPD communication technology to a network implementing an HRPD communication technology. The system includes a non-HRPD base station in communication with an HRPD base station. The non-HRPD base station is configured to convey forward link bearer traffic to and receive reverse link bearer traffic from the MS via non-HRPD network RF resources, receive a handoff trigger, in response to receiving the handoff trigger, request an allocation of HRPD network resources, in response to the request, receive an allocation of HRPD network resources, inform the MS of the allocated HRPD network resources, and release the non-HRPD network RF resources subsequent to an establishment of a traffic channel with the MS by the HRPD base station. The HRPD base station is configured to receive the request for allocation of HRPD network resources, in response to receiving the request, convey an allocation of HRPD network resources, and establish a traffic channel with the MS based on the allocated HRPD network resources.

Yet another embodiment of the present invention encompasses a system for a handoff of a hybrid MS from a network implementing a non-HRPD communication technology to a network implementing an HRPD communication technology. The system includes a non-HRPD base station in communication with an HRPD base station. The non-HRPD base station is configured to convey forward link bearer traffic to, and receiving reverse link bearer traffic from, the MS via RF resources associated with the non-HRPD network, receive a handoff trigger; in response to receiving the handoff trigger, convey a message to the MS that redirects the MS to the HRPD base station, and release the non-HRPD network RF resources subsequent to an establishment of a traffic channel with the MS by the HRPD base station. The HRPD base station is configured to receive a connection request in response to the conveyance by the non-HRPD base station of the redirection message, in response to receiving the connection request, convey to the MS an allocation of HRPD network resources, and establish a traffic channel with the MS based on the allocated HRPD network resources.

Still another embodiment of the present invention encompasses a system for a handoff of a hybrid MS from a network implementing a non-HRPD communication technology to a network implementing an HRPD communication technology. The system includes a non-HRPD base station and an HRPD base station that are each in communication with the MSC. The non-HRPD base station is configured to convey forward link bearer traffic to, and receives reverse link bearer traffic from, the MS via RF resources associated with the non-HRPD network, receive a handoff trigger, in response to receiving the handoff trigger, convey a message to the MSC requesting a handoff of the MS, in response to conveying the message to the MSC, receive information concerning an allocation of HRPD network RF resources from the MSC, inform the MS of the RF resources allocated by the HRPD network, and subsequent to the establishment by the HRPD network of a traffic channel with the mobile station, release the RF resources of the non-HRPD network. The MSC is configured to, in response to receiving the request for a handoff of the MS, obtain an allocation of RF resources from the HRPD network and inform the non-HRPD base station of the allocated RF resources. The HRPD base station is configured to establish a traffic channel with the MS based on the RF resources allocated by the HRPD network.

Yet another embodiment of the present invention encompasses a system for a handoff of a hybrid MS from a network implementing an HRPD communication technology to a network implementing a non-HRPD communication technology. The system includes an HRPD base station in communication with a non-HRPD base station. The HRPD base station is configured to convey forward link bearer traffic to, and receive reverse link bearer traffic from, the MS via radio frequency (RF) resources associated with the HRPD network, receive a handoff trigger, in response to receiving the handoff trigger, request an allocation of non-HRPD network resources, in response to the request, receive an allocation of non-HRPD network resources, and inform the MS of the allocated non-HRPD network resources, and subsequent to an establishment of a traffic channel of the non-HRPD network with the MS, release the RF resources of the HRPD network. The non-HRPD base station is configured to receive a request from the HRPD base station for an allocation of non-HRPD network resources, in response to receiving the request, convey an allocation of non-HRPD network resources to the HRPD base station, and establish a traffic channel with the MS based on the allocated HRPD network resources.

Still another embodiment of the present invention encompasses a system for a handoff of a hybrid MS from a network implementing an HRPD communication technology to a network comprising an MSC and implementing a non-HRPD communication technology. The system includes an HRPD base station and a non-HRPD base station that are each in communication with the MSC. The HRPD base station is configured to convey forward link bearer traffic to, and receive reverse link bearer traffic from, the MS via RF resources associated with the HRPD network, receive a handoff trigger, in response to receiving the handoff trigger, convey a message to the MSC requesting a handoff of the MS, in response to requesting a handoff of the MS, receiving an allocation of non-HRPD network RF resources, inform the MS of the allocated non-HRPD network RF resources and, subsequent to an establishment by a non-HRPD base station of a traffic channel with the MS, release the RF resources of the HRPD network. The MSC is configured to, in response to receiving the request for a handoff of the MS, obtain an allocation of RF resources from the non-HRPD network and inform the HRPD base station of the RF resources allocated by the non-HRPD network. The non-HRPD base station is configured to establish a traffic channel with the MS based on the RF resources allocated by the non-HRPD network.

Turning now to the drawings, the present invention may be more fully described with reference to FIGS. 1-7. FIG. 1 is a block diagram of a wireless communication system 100 in accordance with an embodiment of the present invention. Communication system 100 includes a first, legacy CDMA (Code Division Multiple Access) network 110 that implements a non-high rate packet data (non-HRPD) communication technology and a second, high rate packet data (HRPD) CDMA 2000 network 130 that implements an HRPD communication technology. Each of network 110 and network 130 includes a respective Base Station 114, 134 that comprises a respective Base Transceiver Station (BTS) 116, 136 coupled to a respective Base Station Controller (BSC) 118, 138. Network 110 further includes a Mobile Switching Center (MSC) 120 that is coupled to BS 114, and in particular to BSC 118. MSC 120 may be further coupled to BS 134, and in particular to BSC 138. Networks 110 and 130, and more particularly BSs 114 and 134, are each further coupled to a Packet Data Serving Node (PDSN) 124 and via the PDSN to an external network (not shown) for an exchange of communications with distant parties external to communication system 100.

MSC 120 is coupled to a Home Location Register (HLR) (not shown) and a Visited Location Register (VLR) (not shown). As is known in the art, the HLR and VLR includes mobility and provisioning information associated with each mobile station subscribed to and/or registered for the services of the MSC's associated network 110, such as a profile of the mobile station, including the capabilities of the mobile station, and a BS currently serving the mobile station. BSs 114 and 134 each provides wireless communication services to the mobile stations located in a coverage area of the BS via a respective air interface 112, 132. Each air interface 112, 132 includes a forward link that includes at least one forward link traffic channel and at least one forward link control channel. Each air interface 112, 132 further includes a reverse link that includes at least one reverse link traffic channel, at least one reverse link signaling channel, and an access channel. Each of the forward link and reverse link of air interface 132 further comprises a channel that is dedicated to legacy network-type messaging, that is, to an exchange of 3G1X (Third generation 1X) messages when the legacy network is a CDMA 1X system, in an HRPD system, such as a CDMA 2000 1XEV-DO system. For ease of reference, this channel is referred to herein as a 3G1X channel.

Each of network 110 and network 130, and more particularly BSs 114 and 134, communicate with each other, and with Packet Data Serving Node (PDSN) 124, via an Internet Protocol (IP)-based network 122. In various embodiments of the present invention, BSs 114 and 134 may communicate via a proprietary interface, a new 'A' interface, or via a well-known intersystem protocol, such as the protocol described in the 3GPP2 (Third Generation Partnership Project 2) TIA-41 (Telecommunications Industry Association-41) standard, that is, 3GPP2 N.S0005. The TIA-41 standard provides standardized intersystem procedures for mobility management in cellular systems and prescribes messaging among Mobile Switching Centers, Home Location Registers (HLRs), Visited Location Registers (VLRs), Authentication, Authorization, and Accounting functionality (AAAs), and other core network elements of cellular systems in order to provide services to mobile stations when interaction is required between different cellular systems. In another embodiment of the present invention, BSs 114 and 134 may communicate via an extension of an A1 interface by providing a connection between the BSs via MSC 120.

Communication system 100 further includes a wireless mobile station (MS) 102, for example but not limited to a cellular telephone, a radiotelephone, or a Personal Digital Assistant (PDA), personal computer (PC), or laptop computer equipped for wireless voice communications. In various communications systems, mobile station 102 may also be referred to as an access terminal (AT). Mobile station 102 comprises a hybrid terminal that is capable of engaging in a voice or data call with both legacy CDMA network 110 and HRPD CDMA 2000 network 130. For example, in one embodiment of the present invention, mobile station 102 may include a separate transceiver for operation in each of legacy network 110 and HRPD network 130, thereby allowing the mobile station to concurrently transmit or receive in each of the two networks.

In order for mobile station 102 to engage in a voice call with a distant party via one or more of network 110 and network 130, each of mobile station 102 and networks 110 and 130 operates in accordance with well-known wireless telecommunications protocols. Preferably, legacy network 110 is a CDMA 1X system that operates in accordance with the CDMA 1X standards. Further, HRPD network 130 preferably is a CDMA 2000 1XEV-DO (1X Evolution Data Optimized) system that operates in accordance with the 3GPP2 and TIA/EIA (Telecommunications Industry Association/Electronic Industries Association) IS-856 and 3GPP2 C.S0024 standards, which provide compatibility standards for CDMA 2000 1XEV-DO systems.

Further, each of air interfaces 112 and 132, and correspondingly each of network 110, network 130, and mobile station 102, preferably operates in accordance with the TIA/EIA (Telecommunications Industry Association/Electronic Industries Association) IS-2001 (3GPP2 A.S0011 to A.S0017 Inter Operability Specification, or IOS) standards, which provide a compatibility standard for cellular mobile telecommunications systems that operate as a CDMA 2000 system, such as 1X, 1XEV-DO, 1XEV-DV, and 1XRTT, or any other technology supported by a TIA-2001 based Access Network. In addition, mobile station 102, air interface 132, and BS 134 preferably further operates in accordance with the 3GPP2 A.S0008-0 v3.0 and 3GPP2 A.S0007-A v1.0 Inter Operability Specifications (IOS) for a High Rate Packet Data (HRPD) access network. To ensure compatibility, radio system parameters and call processing procedures are specified by the standards, including call processing steps that are executed by an MS and a base station serving the MS and between the BS and associated infrastructure in order to establish a call or execute a handoff.

In communication system 100, mobile station 102 may roam through the system when the mobile station is engaged in a voice or data communication session. As a result of the roaming, situations may arise where it is desirable to hand off mobile station 102 from legacy network 110 to HRPD network 130 or from HRPD network 130 to legacy network 110. For example and as is known in the art, while roaming in communication system 100 and being serviced by BS 114, mobile station 102 may receive a stronger signal from BS 134 or, while being serviced by BS 134, mobile station 102 may receive a stronger signal from BS 114. Typically signal strengths are determined by a mobile station, such as mobile station 102, measuring a pilot channel associated with each of the serving BS and one or more neighbor BSs. When a pilot channel of a serving BS is weaker than a threshold value and a pilot channel of a neighbor BS, this typically indicates a desirability of a handoff.

By way of another example, location-based information may be used by BS 114 or BS 134 to determine if MS 102 is approaching a coverage area better served by the other BS (that is, BS 114 or 134 may employ edge-sensing functionality to determine whether a handoff is appropriate). BS 114 or 134 may then initiate a handoff to the other BS for MS 102.

By way of yet another example, the costs associated with operating mobile station 102 on network 110 may be different from the costs associated with operating mobile station 102 on network 130. In turn, an operator (or operators) of networks 110 and 130 may charge a different fee for use of each network. As a result, a user of mobile station 102 may program into the subscriber a directive to operate on the lower cost network whenever the mobile station is able to obtain a traffic channel in the lower cost network. When mobile station 102 is engaged in a voice call in a higher cost network and is able to obtain a traffic channel in the lower cost network, the mobile station, or the user of the mobile station if the user is informed of the availability of a traffic channel in the lower cost network, may initiate a handoff to the lower cost network.

By way of still another example, for load leveling purposes, for network cost consideration purposes, or due to a need to clear traffic channels in a coverage area in order to facilitate emergency communications, an operator of a communication system such as communication system 100 may find it desirable to move a mobile station, such as mobile station 102, that is actively engaged in a voice call in a first network, such as network 110 or network 130, to the other network.

Figure 2:
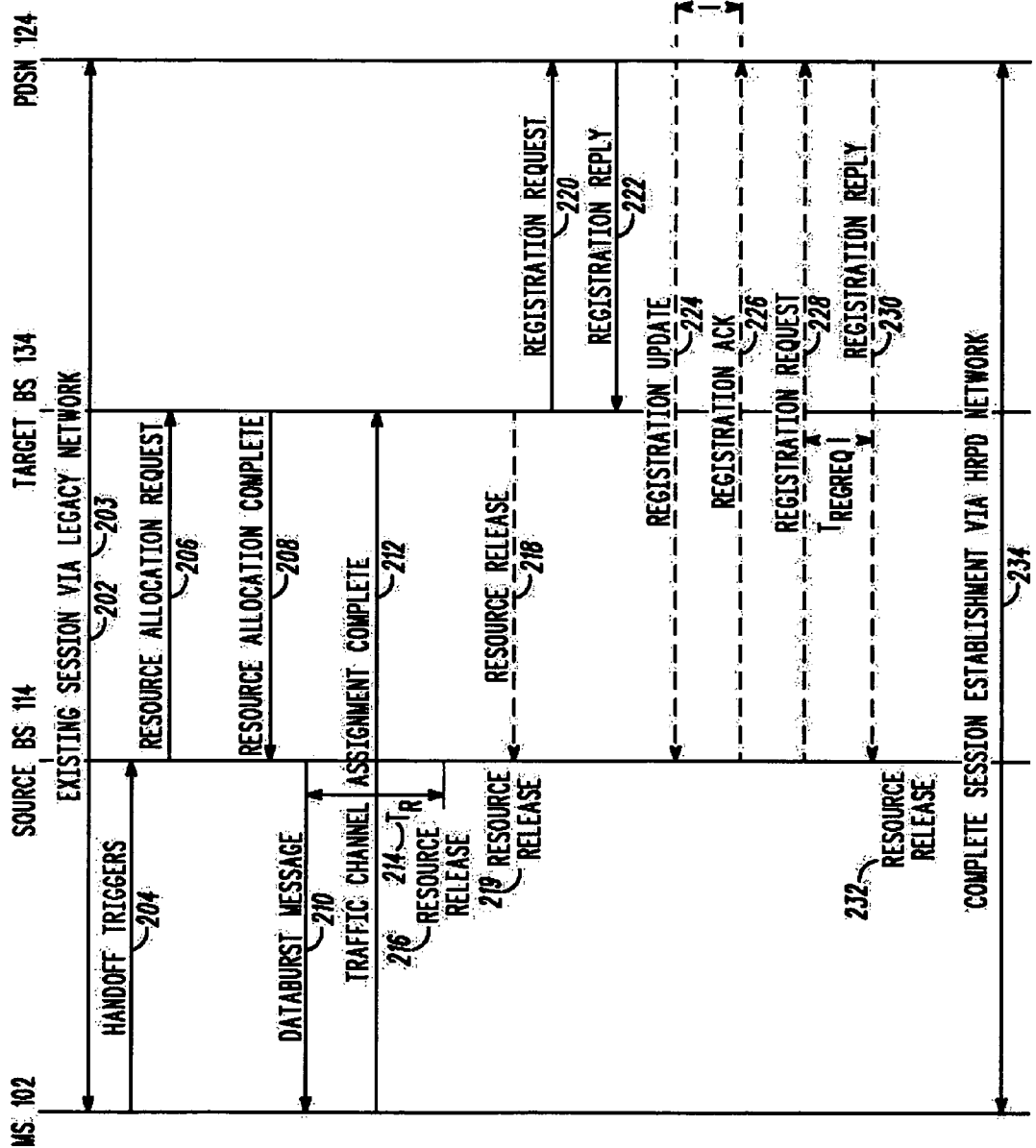
FIG. 2 is a signal flow diagram illustrating a handoff of a communication session from a legacy network of FIG. 1 to a high rate packet data network of FIG. 1 in accordance with various embodiments of the present invention.

In order to facilitate a handoff of a mobile station such as mobile station 102, communication system 100 provides a method and apparatus for an active handoff of mobile station 102 from legacy network 110 to HRPD network 130 or from network 130 to network 110 when the mobile station is actively engaged in a communication session. Referring now to FIG. 2, a signal flow diagram 200 is provided that depicts a handoff executed by communication system 100 in handing off a communication session from legacy network 110 to HRPD network 130 in accordance with a first embodiment of the present invention.

Signal flow diagram 200 begins when mobile station 102 is actively engaged 202, 203 in a communication session with a distant party via legacy network 110. In order to participate in the communication session via legacy network 110, mobile station 102 must already be registered with the legacy network. Registration procedures are well-known in the art and will not be described in detail herein except to note that when a mobile station registers with a network, the network stores in an associated HLR or VLR, or an associated Foreign Agent (FA) or Home Agent (HA), whichever is appropriate, an identification of a BS associated with the network and serving the mobile station.

As part of the communication session, mobile station 102 conveys 202 reverse link frames comprising bearer traffic to PDSN 124 via a reverse link traffic channel of air interface 112, BS 114, and IP network 122 for routing to the distant party via an external network (not shown). Further, when PDSN 124 receives bearer traffic from the distant party and intended for mobile station 102, the PDSN routes 203 the voice information to BS 114 via IP network 122 and the BS conveys forward link frames comprising the bearer traffic to mobile station 102 via a forward link traffic channel of air interface 112.

While mobile station 102 is engaged in the communication session with BS 114, the BS receives 204 a message that triggers a handoff of the mobile station. The handoff trigger message may be based on, among other considerations, any one or more of signal strength measurements of the respective pilot channels, a location of the mobile station, network cost or load considerations, and a directive of a user of the mobile station. For example, while activated in networks 110 and 130, mobile station 102 may monitor pilot channels associated with multiple BSs, such as BSs 114 and 134. In one such embodiment of the present invention, based on the monitored pilot channels, mobile station 102 may determine that the call should be handed off from BS 114 to HRPD network 130, and more particularly to BS 134. Mobile station 102 may then convey a handoff trigger message, preferably a HANDOFF REQUEST message as described in detail in the IOS specifications, to BS 114 that instructs the BS to initiate a handoff. The message may further notify BS 114 of a target network or BS, that is, network 130 or BS 134, and/or BS 114 may determine the target network and/or BS by reference to MSC 120, which determines the target network and/or BS by reference to at least one of the HLR and VLR coupled to the MSC. In other embodiments of the present invention, mobile station 102 may convey a handoff trigger message such as a HANDOFF REQUEST message in response being instructed by a user of the mobile station to request a handoff to network 130 or in response to self-determining to transfer networks based on cost considerations.

In still other embodiments of the present invention, the handoff trigger message may comprise a pilot strength measurement report conveyed by the mobile station to BS 114. For example, based on the monitored pilot channels, mobile station may determine to convey a pilot strength measurement report to BS 114 that reports the strength of the monitored pilots. Based on the received pilot strength measurement report and in accordance with well-known procedures, BS 114 may then determine to handoff mobile station to a target BS, that is, BS 134.

In yet other embodiments of the present invention, the handoff trigger message may comprise mobile station 102 location information received by network 110 from any of mobile station 102, other network elements within network 110, or a satellite system, or may comprise instructions that are internally generated by network 110 and that instruct BS 114 to handoff the mobile station. For example, an operator of network 110 may generate handoff instructions based on cost considerations or load considerations with respect to the operation of network 110 or based on a need to free up channels in network 110 due to an imminent or a pending emergency situation.

In response to receiving the handoff trigger message, BS 114 conveys 206 a resource allocation request to the target BS, that is, BS 134, via IP network 122. When only target network 130 has been identified by network 110, then network 130 is aware of an appropriate BS as is known in the art and routes the request to the appropriate BS, that is, BS 134. The resource allocation request identifies the mobile station, that is, mobile station 102, requesting the handoff and further requests that BS 134 allocate traffic channels to the identified mobile station. In response to receiving the resource allocation request, BS 134 allocates a forward link traffic channel and a reverse link traffic channel in air interface 132 to mobile station 102 and conveys 208 a legacy network resource allocation complete message to BS 114. The resource allocation complete message is a legacy network message, such as a Handoff Command message, that informs of the allocated forward link and reverse link traffic channels by encapsulating a HRPD traffic channel assignment message, for example, a DO_TCH_ASSIGNMENT message, as a payload of the message.

In response to receiving the legacy network resource allocation complete message, BS 114 informs 210 mobile station 102 of the traffic channels allocated to the mobile station in air interface 132. Preferably, BS 114 informs mobile station 102 of the allocated traffic channels by parsing the resource allocation complete message to retrieve the payload, that is, the HRPD traffic channel assignment message, and then encapsulating the HRPD traffic channel assignment message received from BS 134 as the payload in a conventional legacy network message, for example, a legacy network message delivery mechanism such as Data Burst Message (DBM). In response to receiving the legacy network message from BS 114, mobile station 102 parses the message, recognizes the payload as comprising an HRPD traffic channel assignment message, and identifies the traffic channels allocated to the mobile station in air interface 132 based on the encapsulated HRPD traffic channel assignment message. Mobile station 102 then attempts to acquire the identified traffic channels in accordance with well-known channel acquisition techniques. Upon successfully acquiring the traffic channels, mobile station 102 informs 212 BS 134 that the mobile station has successfully acquired the traffic channels allocated at BS 134, preferably by conveying a traffic channel assignment complete message to the BS.

After mobile station 102 has successfully acquired the traffic channels associated with BS 134, BS 114 releases the resources allocated by the BS to mobile station 102. In one variation of the first embodiment of the present invention, the release of the resources allocated by BS 114 to mobile station 102 may be timer-based. That is, when BS 114 conveys the legacy network data burst message to mobile station 102, BS 114 further starts 214 a release timer, $T_R$, associated with, and preferably located in, the BS. The release timer is used by BS 114 to determine when to release the resources, such as radio frequency (RF) resources in air interface 112 and signal processing resources in BTS 116, allocated by the BS to mobile station 102. As a result, the release timer counts down a quantity of time that is predetermined to be sufficient for a hybrid mobile station, such as mobile station 102, to successfully acquire traffic channels allocated to the mobile station by a BS other than BS 114 as part of an inter-technology handoff. In response to an expiration of release timer $T_R$, BS 114 releases 216 the resources allocated by the BS to mobile station 102.

In another variation of the first embodiment of the present invention, instead of a timer-based release of resources by BS 114, BS 114 may release the resources allocated by the BS to mobile station 102 based on information received from BS 134. That is, when BS 134 is informed 212 by mobile station 102 that the mobile station has successfully acquired the allocated traffic channels at the BS, BS 134 then informs 218 BS 114 of a successful handoff, preferably by conveying a RESOURCE RELEASE message to BS 114. In response to being informed of the successful handoff, BS 114 releases 219 the resources allocated by BS 114 to mobile station 102.

In response to receiving the traffic channel assignment complete message, BS 134 completes the establishment of a bearer path for mobile station 102 in HRPD network 130 by registering the mobile station with PDSN 124 and setting up a new tunnel to the PDSN. Preferably, BS 134 registers the mobile station and sets up a new tunnel by conveying 220 an A11 REGISTRATION REQUEST message to the PDSN. The A11 REGISTRATION REQUEST identifies the mobile station and requests the set up of the tunnel. In response to receiving the A11 REGISTRATION REQUEST, PDSN 124 allocates a connection to BS 134 and informs the BS of the allocated connection, preferably by conveying 222 an A11 REGISTRATION REPLY to the BS. The establishment of communication session between PDSN 124 and mobile station 102 via BS 134 is then completed 234 in accordance with well-known techniques.

In still another variation of the first embodiment of the present invention, BS 114 may release the resources allocated by the BS to mobile station 102 based on information received by BS 114 from PDSN 124. That is, when PDSN 124 receives 220 the A11 REGISTRATION REQUEST message from BS 134, the PDSN conveys 224 a REGISTRATION UPDATE message to BS 114 which identifies mobile station 102 and instructs the BS to request an update of registration information concerning mobile station 102. In response to receiving the REGISTRATION UPDATE message, BS 114 requests 228 updated registration information from PDSN 124 for mobile station 102, preferably by conveying a REGISTRATION REQUEST message to PDSN 124. BS 114 may further acknowledge 226 the REGISTRATION UPDATE message, for example by conveying a REGISTRATION ACK message back to the PDSN. In response to receiving the request for updated registration information for mobile station 102, PDSN 124 then informs BS 114 of the successful handoff of the mobile station to BS 134, preferably by conveying a REGISTRATION REPLY message to BS 114 that informs that the mobile station is now serviced by BS 134. In response to being informed of the successful handoff of mobile station 102, BS 114 releases 232 the resources allocated by BS 114 to the mobile station.

Figure 3:
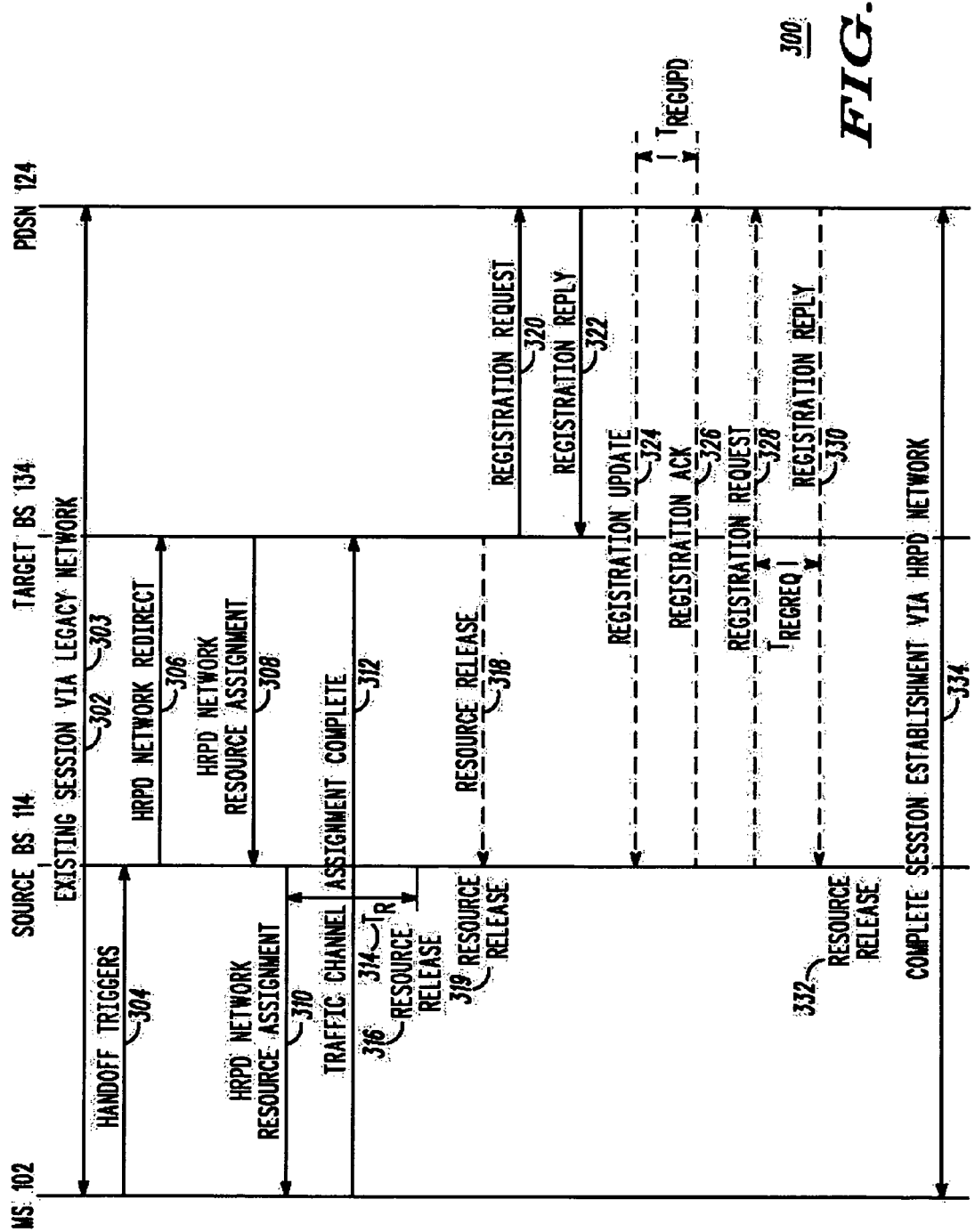
FIG. 3 is a signal flow diagram illustrating a handoff of a communication session from a legacy network of FIG. 1 to a high rate packet data network of FIG. 1 in accordance with other embodiments of the present invention.

In a second embodiment of the present invention, instead of BS 114 informing mobile station 102 of the traffic channels allocated to the mobile station in HRPD air interface 132 by encapsulating a HRPD traffic channel assignment message in a conventional legacy network message, BS 114 may inform mobile station 102 of the traffic channels allocated to the mobile station in HRPD air interface 132 via a legacy network message dedicated to providing HRPD traffic channel information. Referring now to FIG. 3, a signal flow diagram 300 is provided that depicts of a handoff executed by communication system 100 in handing off a communication session from legacy network 110 to HRPD network 130 in accordance with the second embodiment of the present invention.

Similar to signal flow diagram 200, signal flow diagram 300 begins when mobile station 102 is actively engaged 302, 303 in a communication session with a distant party via legacy network 110. At this point in time, mobile station 102 is already registered with the legacy network and monitors pilot channels associated with base stations other than BS 114, such as BS 134. As part of the communication session, mobile station 102 conveys 302 reverse link frames comprising bearer traffic to PDSN 124 via a reverse link traffic channel of air interface 112, BS 114, and IP network 122 for routing to the distant party via an external network (not shown). Further, when PDSN 124 receives bearer traffic from the distant party and intended for mobile station 102, the PDSN routes 303 the voice information to BS 114 via IP network 122 and the BS conveys forward link frames comprising the bearer traffic to mobile station 102 via a forward link traffic channel of air interface 112.

At some point in time during the course of the communication session, BS 114 receives 304 a handoff trigger message indicating a need or desire to handoff mobile station 102. Such handoff trigger messages are described in greater detail above and will not be further described in detail. In response to receiving the handoff trigger message, BS 114 conveys 306 an HRPD network redirect message, such as a DO_REDIRECT message, to target network 130 and via the target network to the target HRPD network BS, that is, BS 134, via IP network 122. The redirect message identifies the mobile station, that is, mobile station 102, requesting the handoff and further requests that BS 134 allocate traffic channels to the identified mobile station. In response to receiving the redirect message, BS 134 allocates a forward link traffic channel and a reverse link traffic channel in air interface 132 to mobile station 102 and conveys 308 an HRPD network resource assignment message to BS 114 that informs of the allocated forward link and reverse link traffic channels.

In response to receiving the HRPD network resource assignment message, BS 114 conveys 310 a legacy network HRPD resource assignment message to mobile station 102. The legacy network HRPD resource assignment message is a legacy network message that is dedicated to providing HRPD traffic channel information and includes information, for example, in a message type data field in a header of the message, identifying the message as a HRPD traffic channel information message. The legacy network HRPD resource assignment message informs mobile station 102 of the HRPD resources assigned to the mobile station, that is, of the forward link traffic channel and the reverse link traffic channel allocated to the mobile station in air interface 132. In response to receiving the legacy network HRPD resource assignment message from BS 114, mobile station 102 identifies the traffic channels allocated to the mobile station in air interface 132. Mobile station 102 then attempts to acquire the identified traffic channels in accordance with well-known channel acquisition techniques.

Again similar to signal flow diagram 200, upon successfully acquiring the traffic channels, mobile station 102 informs 312 BS 134 that the mobile station has successfully acquired the traffic channels allocated at BS 134, preferably by conveying a traffic channel assignment complete message to the BS. In addition, at some point in time after mobile station 102 has successfully acquired the traffic channels allocated at BS 134, BS 114 releases (316, 319, 332) the resources allocated by the BS to mobile station 102. As described herein in greater detail with respect to signal flow diagram 200, the release of the resources allocated by BS 114 to mobile station 102 may be timer-based (314, 316), may be based on information received from BS 134 (318, 319), such as a RESOURCE RELEASE message conveyed by BS 134 to BS 114, or may be based on information conveyed to BS 114 by PDSN 124 (324, 328, 330). For example, and as described in greater detail above, in the last instance, in response to receiving (at 320) a REGISTRATION REQUEST message, PDSN 124 may convey 324 a REGISTRATION UPDATE message to BS 114. In response to receiving the REGISTRATION UPDATE message, BS 114 may convey 328 a REGISTRATION REQUEST message to the PDSN. In response to receiving the REGISTRATION REQUEST message, PDSN 124 may convey 330 a REGISTRATION REPLY message to BS 114. In response to receiving the REGISTRATION REPLY message, BS 114 may release the resources allocated to mobile station 102. Once again, in the last instance, BS 114 may further acknowledge 326 the REGISTRATION UPDATE message, for example by conveying a REGISTRATION ACK message back to the PDSN.

Further, and again similar to signal flow diagram 200, in response to being informed (at 312) that the mobile station has successfully acquired the traffic channels allocated at BS 134, BS 134 completes the establishment of a bearer path for mobile station 102 in HRPD network 130 by registering the mobile station with PDSN 124 and setting up a new tunnel to the PDSN. Preferably, BS 134 registers the mobile station and sets up a new tunnel by conveying 320 an A11 REGISTRATION REQUEST message to the PDSN. In response to receiving the A11 REGISTRATION REQUEST, PDSN 124 allocates a connection to BS 134 and informs the BS of the allocated connection, preferably by conveying 322 an A11 REGISTRATION REPLY to the BS. The establishment of communication session between PDSN 124 and mobile station 102 via BS 134 is then completed 334 in accordance with well-known techniques.

Figure 4:
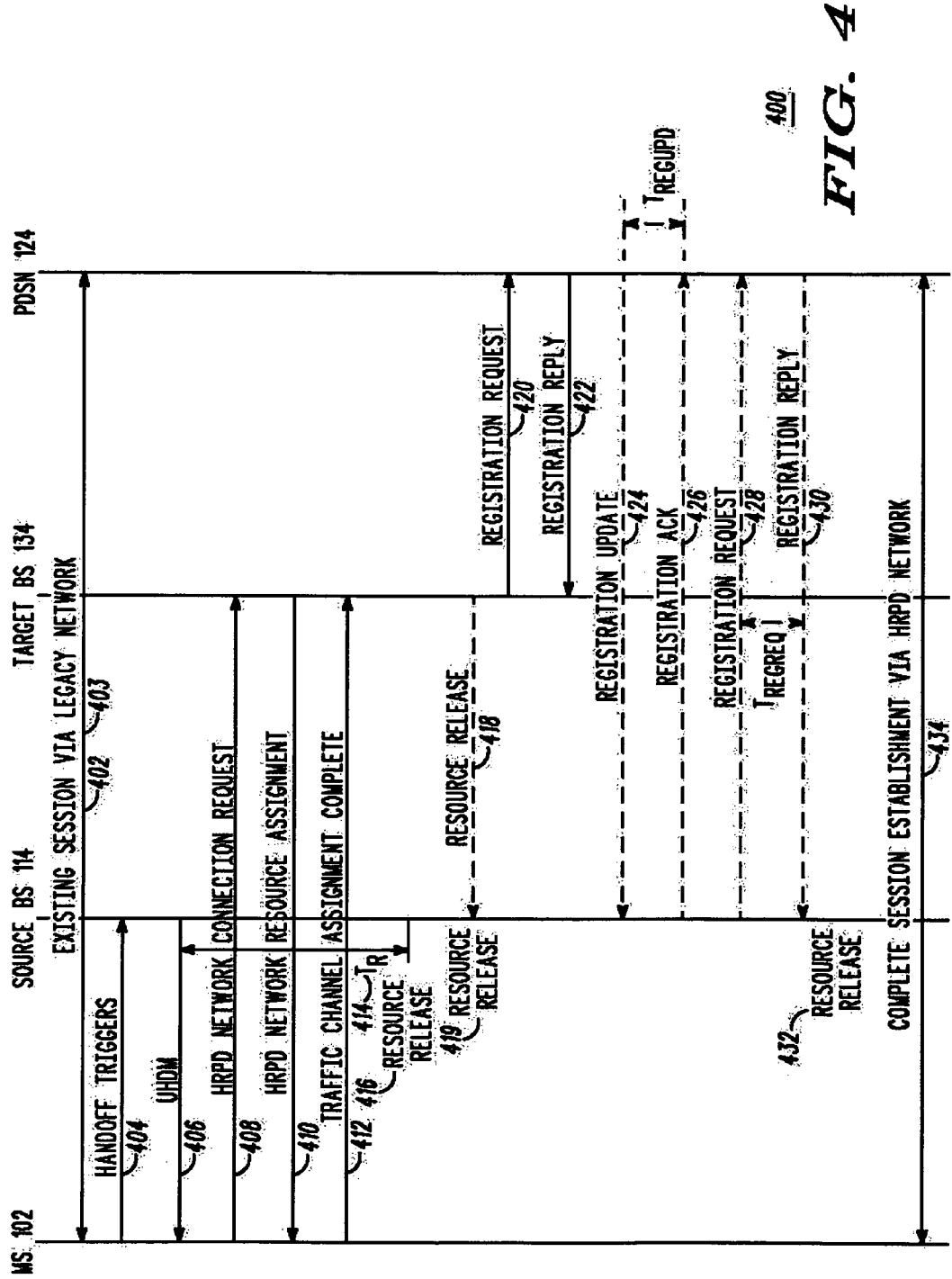
FIG. 4 is a signal flow diagram illustrating a handoff of a communication session from a legacy network of FIG. 1 to a high rate packet data network of FIG. 1 in accordance with other embodiments of the present invention.

In a third embodiment of the present invention, instead of BS 114 informing mobile station 102 of the traffic channels allocated to the mobile station in HRPD air interface 132 by encapsulating a HRPD traffic channel assignment message in a conventional legacy network message or by conveying a legacy network message dedicated to providing HRPD traffic channel information, BS 114 may re-direct mobile station to HRPD network 130, that is, to BS 134, upon being notified of the mobile station's desire to initiate a handoff. Referring now to FIG. 4, a signal flow diagram 400 is provided that depicts a handoff executed by communication system 100 in handing off a communication session from legacy network 110 to HRPD network 130 in accordance with the third embodiment of the present invention.

Similar to signal flow diagrams 200 and 300, signal flow diagram 400 begins when mobile station 102 is actively engaged 402, 403 in a communication session with a distant party via legacy network 110. At this point in time, mobile station 102 is already registered with the legacy network and monitors pilot channels associated with base stations other than BS 114, such as BS 134. As part of the communication session, mobile station 102 conveys 402 reverse link frames comprising bearer traffic to PDSN 124 via a reverse link traffic channel of air interface 112, BS 114, and IP network 122 for routing to the distant party via an external network (not shown). Further, when PDSN 124 receives bearer traffic from the distant party and intended for mobile station 102, the PDSN routes 403 the voice information to BS 114 via IP network 122 and the BS conveys forward link frames comprising the bearer traffic to mobile station 102 via a forward link traffic channel of air interface 112.

At some point in time during the course of the communication session, BS 114 receives a handoff trigger message 404 indicating a need or desire to handoff mobile station 102. Such handoff trigger messages are described in greater detail above and will not be further described in detail. In response to receiving the handoff trigger message, BS 114 conveys 406 a message to mobile station 102 that redirects the mobile station to target HRPD network 130 and/or target BS 134. In one variation of the third embodiment of the present invention, the notification received by BS 114 from mobile station 102 may notify the BS of the target network and/or BS. In another variation of the third embodiment of the present invention, BS 114 may determine the target network and/or BS by reference to MSC 120, which determines the target network and/or BS by reference to at least one of the HLR and VLR coupled to the MSC. Preferably, the redirection message comprises a modified version of a Universal Handoff Direction Message (UHDM), as described in the 3GPP2 C.S0005.C standard, which standard is hereby incorporated by reference herein, which message is modified to include additional data fields that provide HRPD redirection information, such as identifiers associated with target network 130 or BS 134 and/or one or more of a control channel and access channel associated with the target network or BS. When only target network 130 is identified, the target network may then route messages received from BS 114 or mobile station 102 to target BS 134.

In response to receiving the redirection message, mobile station 102 requests 408 an assignment of resources from target BS 134, preferably by conveying an HRPD network connection request directly to the BS via air interface 132. Connection requests are well-known in the art and will not be described in greater detail herein. In response to receiving the HRPD network connection request, BS 134 allocates a forward link traffic channel and a reverse link traffic channel in air interface 132 to mobile station 102 and conveys 410 an HRPD network resource assignment message directly to mobile station 102 via the forward link of air interface 132, which message informs of the allocated forward link and reverse link traffic channels. In response to receiving the HRPD network resource assignment message from BS 114, mobile station 102 identifies the traffic channels allocated to the mobile station in air interface 132. Mobile station 102 then attempts to acquire the identified traffic channels in accordance with well-known channel acquisition techniques.

Again similar to signal flow diagrams 200 and 300, upon successfully acquiring the traffic channels, mobile station 102 informs 412 BS 134 that the mobile station has successfully acquired the traffic channels allocated at BS 134, preferably by conveying a traffic channel assignment complete message to the BS. In addition, at some point in time after mobile station 102 has successfully acquired the traffic channels allocated at BS 134, BS 114 releases (416, 419, 432) the resources allocated by the BS to mobile station 102. As described herein in greater detail with respect to signal flow diagram 200, the release of the resources allocated by BS 114 to mobile station 102 may be timer-based (414, 416), may be based on information received from BS 134 (418, 419), such as a RESOURCE RELEASE message conveyed by BS 134 to BS 114, or may be based on information conveyed to BS 114 by PDSN 124 (424, 428, 430). For example, and as described in greater detail above, in the last instance, in response to receiving (at 420) a REGISTRATION REQUEST message, PDSN 124 may convey 424 a REGISTRATION UPDATE message to BS 114. In response to receiving the REGISTRATION UPDATE message, BS 114 may convey 428 a REGISTRATION REQUEST message to the PDSN. In response to receiving the REGISTRATION REQUEST message, PDSN 124 may convey 430 a REGISTRATION REPLY message to BS 114. Once again, in the last instance, BS 114 may further acknowledge 426 the REGISTRATION UPDATE message, for example by conveying a REGISTRATION ACK message back to the PDSN.

Further, and again similar to signal flow diagrams 200 and 300, in response to being informed (at 412) that the mobile station has successfully acquired the traffic channels allocated at BS 134, BS 134 completes the establishment of a bearer path for mobile station 102 in HRPD network 130 by registering the mobile station with PDSN 124 and setting up a new tunnel to the PDSN. Preferably, BS 134 registers the mobile station and sets up a new tunnel by conveying 420 an A11 REGISTRATION REQUEST message to the PDSN. In response to receiving the A11 REGISTRATION REQUEST, PDSN 124 allocates a connection to BS 134 and informs the BS of the allocated connection, preferably by conveying 422 an A11 REGISTRATION REPLY to the BS. The establishment of communication session between PDSN 124 and mobile station 102 via BS 134 is then completed 434 in accordance with well-known techniques.

Figure 5:
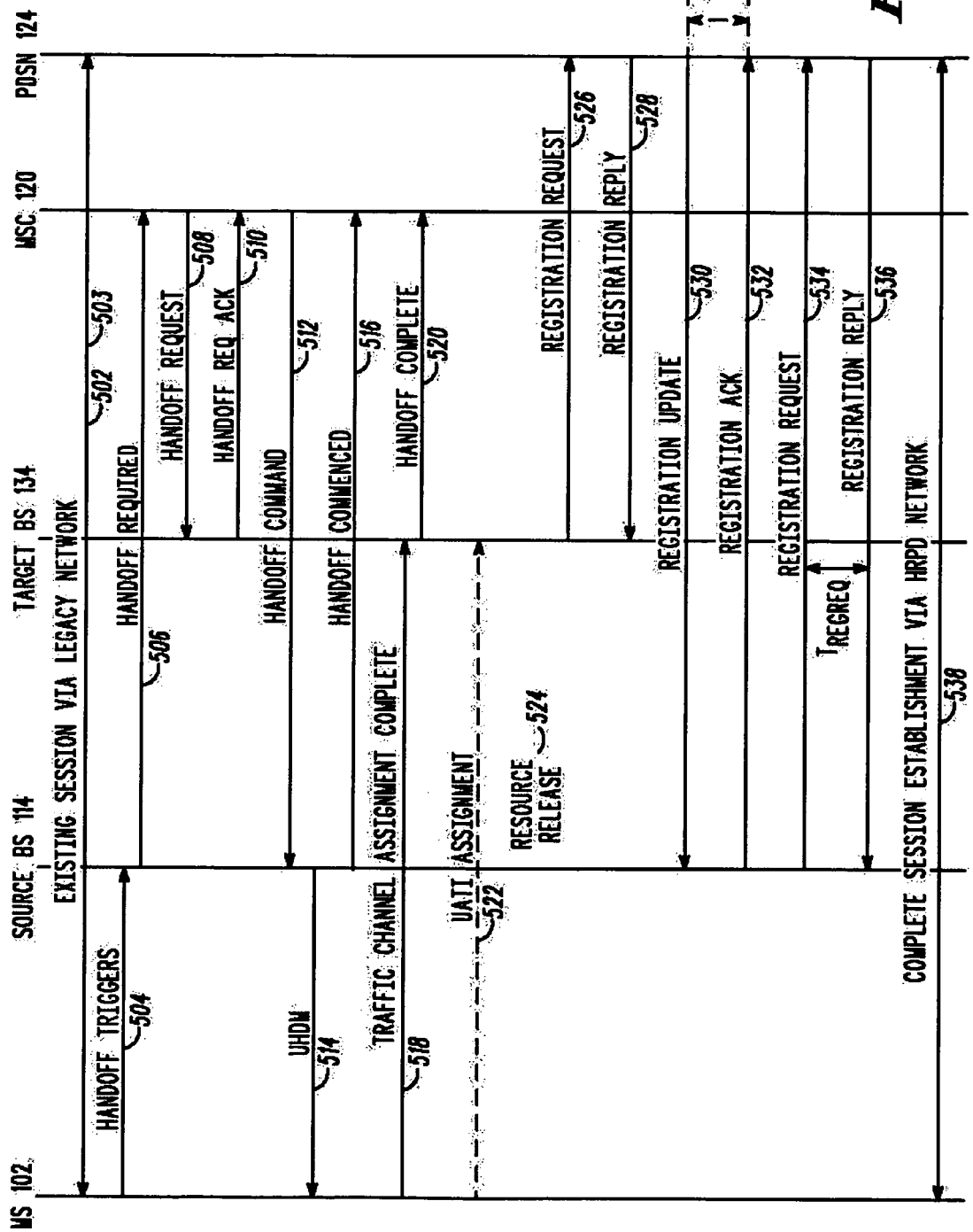
FIG. 5 is a signal flow diagram illustrating a handoff of a communication session from a legacy network of FIG. 1 to a high rate packet data network of FIG. 1 in accordance with other embodiments of the present invention.

In a fourth embodiment of the present invention, a handoff from legacy network 110 to HRPD network 130 may controlled by MSC 120. Referring now to FIG. 5, a signal flow diagram 500 is provided that depicts a handoff executed by communication system 100 in handing off a communication session from legacy network 110 to HRPD network 130 in accordance with the fourth embodiment of the present invention. Signal flow diagram 500 begins when mobile station 102 is actively engaged 502, 503 in a communication session with a distant party via legacy network 110. At this point in time, mobile station 102 is already registered with the legacy network and monitors pilot channels associated with base stations other than BS 114, such as BS 134. As part of the communication session, mobile station 102 conveys 502 reverse link frames comprising bearer traffic to PDSN 124 via a reverse link traffic channel of air interface 112, BS 114, and IP network 122 for routing to the distant party via an external network (not shown). Further, when PDSN 124 receives bearer traffic from the distant party and intended for mobile station 102, the PDSN routes 503 the voice information to BS 114 via IP network 122 and the BS conveys forward link frames comprising the bearer traffic to mobile station 102 via a forward link traffic channel of air interface 112.

At some point in time during the course of the communication session, BS 114 receives a handoff trigger message 504 indicating a need or desire to handoff mobile station 102. Such handoff trigger messages are described in greater detail above and will not be further described in detail. In response to receiving the handoff trigger message, BS 114 conveys 506 a message, preferably a HANDOFF REQUIRED message, to MSC 120 that requests a handoff of mobile station 102. In response to receiving the handoff request from BS 114, MSC 120 retrieves HRPD communication session parameters, such as PDSN IP and mobile capability information, from HRPD network 130, and in particular BS 134. However, in a variation of the fourth embodiment, MSC 120 may retrieve the HRPD communication session parameters from any HRPD network BS.

MSC 120 further obtains an allocation of RF resources from HRPD network 130, including forward link and reverse link traffic channels in air interface 132, for mobile station 102. Preferably, MSC 120, which is in communication with BS 134 in this instance, requests 508 the resources from an HRPD network BS, that is, BS 134, for a handoff of mobile station 102, for example, by conveying a HANDOFF REQUEST to BS 134. In response to receiving the resource request from MSC 120, BS 134 allocates HRPD network resources to the handoff, including a forward link traffic channel and a reverse link traffic channel in air interface 132. BS 134 then conveys 510 an acknowledgement, preferably a HANDOFF REQUEST ACK, to MSC 120 that informs of the allocated resources, including the forward link and reverse link traffic channels allocated in air interface 132. MSC 120 then instructs 512 BS 114 to initiate a handoff of mobile station 102, which instruction further informs of the HRPD network resources allocated by BS 134. Preferably, the handoff instruction comprises a modified version of a HANDOFF COMMAND message, which message is modified to include data fields that identify the allocated HRPD network resources.

In response to receiving the handoff instruction, BS 114 conveys 514 a message to mobile station 102 that redirects the mobile station to target HRPD network 130 and target BS 134. Preferably, the redirection message comprises a modified version of a Universal Handoff Direction Message (UHDM), which message is modified to include additional data fields that provide HRPD network redirection information, such as identifiers associated with target BS 134 and/or one or more of a control channel and access channel associated with the target BS, and to further include some or all of the HRPD network resources allocated by BS 134. In addition, BS 114 informs 516 MSC 120 that the handoff has commenced, preferably by conveying a HANDOFF COMMENCED message to the MSC.

In response to receiving the redirection message from BS 114, mobile station 102 identifies the traffic channels allocated to the mobile station in air interface 132. Mobile station 102 then attempts to acquire the identified traffic channels in accordance with well-known channel acquisition techniques. Upon successfully acquiring the traffic channels, mobile station 102 informs 518 BS 134 that the mobile station has successfully acquired the traffic channels allocated at BS 134, preferably by conveying a traffic channel assignment complete message to the BS. In response to being informed that mobile station 102 has successfully acquired the traffic channels allocated at BS 134, BS 134 informs MSC 120 that the handoff is complete, preferably by conveying a HANDOFF COMPLETE message to the MSC. In addition, when BS 134 is not the same HRPD network BS as the HRPD BS that supplied the HRPD communication session parameters to BS 114, BS 134 further performs 522 a Unicast Address Terminal Identifier (UATI) assignment, that is, a unicast address assigned to mobile station 102 per the Address Management Protocol defined in the 3GPP2 C.S0024-0 standard, which standard is hereby incorporated by reference herein.

At some point in time after mobile station 102 has successfully acquired the traffic channels allocated at BS 134, BS 114 releases 524 the resources allocated by the BS to mobile station 102. For example, as described above in greater detail, the release of the resources allocated by BS 114 to mobile station 102 may be timer-based, or the release of the resources may be based upon an exchange of messages, pursuant to known legacy network resource release protocols, between the BS and the mobile station after the mobile station has successfully acquired the traffic channels allocated at BS 134.

Similar to signal flow diagrams 200, 300, and 400, in response to being informed (at 518) that the mobile station has successfully acquired the traffic channels allocated at BS 134, BS 134 completes the establishment of a bearer path for mobile station 102 in HRPD network 130 by registering the mobile station with PDSN 124 and setting up a new tunnel to the PDSN. Preferably, BS 134 registers the mobile station and sets up a new tunnel by conveying 526 an A11 REGISTRATION REQUEST message to the PDSN. In response to receiving the A11 REGISTRATION REQUEST, PDSN 124 allocates a connection to BS 134 and informs the BS of the allocated connection, preferably by conveying 528 an A11 REGISTRATION REPLY to the BS.

PDSN 124 then instructs 530 BS 114 to request an update of registration information concerning mobile station 102, preferably by conveying a REGISTRATION UPDATE message to the BS that further identifies mobile station 102. In response to receiving the REGISTRATION UPDATE message, BS 114 then requests 534 updated registration information from PDSN 124 for mobile station 102, preferably by conveying a REGISTRATION REQUEST message to PDSN 124. BS 114 may further acknowledge 532 the REGISTRATION UPDATE message, for example by conveying a REGISTRATION ACK message back to the PDSN. In response to receiving the request for updated registration information for mobile station 102, PDSN 124 then informs 536 BS 114 of the successful handoff of the mobile station to BS 134, preferably by conveying a REGISTRATION REPLY message to BS 114. If BS 114 has not yet released the resources allocated by BS 114 to mobile station 102, BS 114 may now release such resources. The establishment of communication session between PDSN 124 and mobile station 102 via BS 134 is then completed 538 in accordance with well-known techniques.

Thus by use of a redirection message, an encapsulation of an HRPD network message in a legacy network message, or a legacy network message that is dedicated to providing HRPD traffic channel information, communication system 100 provides for a handoff of hybrid mobile station 102 from legacy, or non-HRPD, network 110 to HRPD network 130. In various embodiments of the present invention, legacy network 110 receives a handoff trigger and, in response to receiving the handoff trigger, requests an allocation of HRPD network RF resources from HRPD network 130. In response to the receiving the request, HRPD network 130 allocates RF resources to mobile station 102 and informs legacy network 110 of the allocated RF resources via an HRPD network message. Legacy network 110 then informs mobile station 102 of the allocated HRPD RF resources by encapsulating the HRPD network message in a legacy network message or by use of a legacy network message that is dedicated to providing HRPD traffic channel information. Based on the allocated HRPD RF resources, mobile station 102 then establishes a traffic channel with HRPD network 130. Subsequent to the establishment of the traffic channel, legacy network 110 releases non-HRPD network RF resources associated with the mobile station. The release may be timer-based or may be based on a message received by legacy network 110 from HRPD base station 134 or from PDSN 124.

In yet other embodiments of the present invention, in response to receiving the handoff trigger, legacy network 110 may redirect mobile station 102 to HRPD network 130 instead of obtaining an allocation of HRPD RF resources from HRPD network 130 and informing the mobile station of the allocated RF resources. In still another embodiment of the present invention, the handoff may be controlled by MSC 120 instead of by messaging exchanged between the legacy and HRPD base stations 114, 134.

Figure 6:
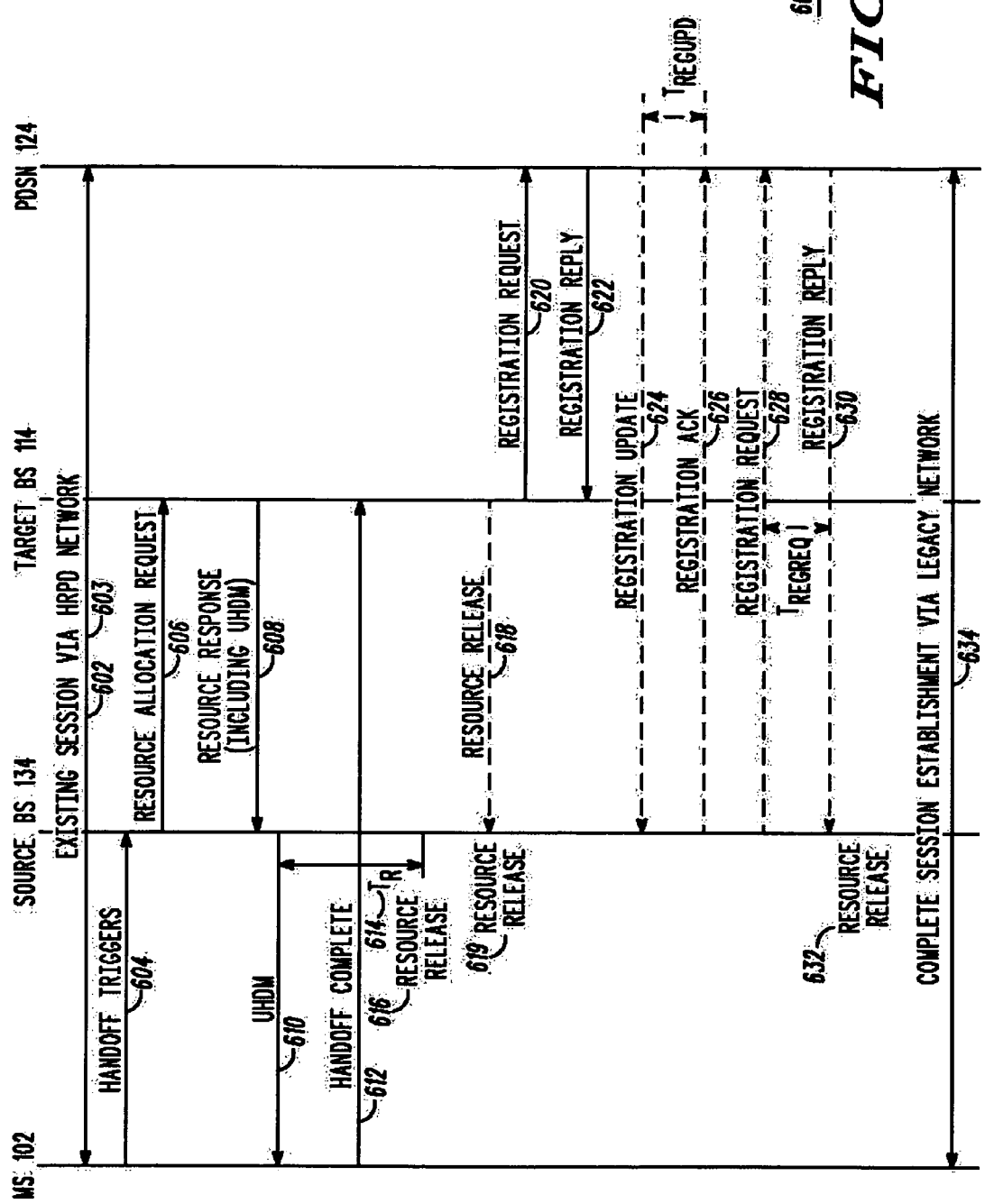
FIG. 6 is a signal flow diagram illustrating a handoff of a communication session from a high rate packet data network of FIG. 1 to a legacy network of FIG. 1 in accordance with other embodiments of the present invention.

Referring now to FIG. 6, a signal flow diagram 600 is provided that depicts a handoff executed by communication system 100 in handing off a communication session from HRPD network 130 to legacy network 110 in accordance with a fifth embodiment of the present invention. Signal flow diagram 600 begins when mobile station 102 is actively engaged 602, 603 in a communication session with a distant party via HRPD network 130. In order to participate in the communication session via HRPD network 130, mobile station 102 must already be registered with the HRPD network.

As part of the communication session, mobile station 102 conveys 602 reverse link frames comprising bearer traffic to PDSN 124 via a reverse link traffic channel of air interface 132, BS 134, and IP network 122 for routing to the distant party via an external network (not shown). Further, when PDSN 124 receives bearer traffic from the distant party and intended for mobile station 102, the PDSN routes 603 the voice information to BS 134 via IP network 122 and the BS conveys forward link frames comprising the bearer traffic to mobile station 102 via a forward link traffic channel of air interface 132. At this point in time, mobile station 102 is further registered with the legacy network and monitors pilot channels associated with base stations other than BS 134, such as BS 114.

At some point in time during the course of the communication session, BS 134 receives 604 a handoff trigger message indicating a need or desire to handoff mobile station 102. Such handoff trigger messages are described in greater detail above and will not be further described in detail. In response to receiving the handoff trigger message, BS 134 conveys 606 a resource request message to the target network 110 via IP network 122, and via the target network to the target BS, that is, BS 114. For example, the resource request message may identify the target BS or target network 130 may route the resource request message to the target BS by reference to one or more of the HLR and/or VLR associated with MSC 120. The resource request message identifies the mobile station, that is, mobile station 102, requesting the handoff and further requests that the target network 110 allocate resources, including traffic channels, to the identified mobile station.

In response to receiving the resource request message, BS 114 allocates a forward link traffic channel and a reverse link traffic channel in air interface 112 to mobile station 102. BS 114 then informs 608 BS 134 of the allocated channels by conveying a legacy network resource response message to BS 134. Preferably, the resource response message includes a handoff direction message, preferably a modified version of a UHDM that is modified to include additional data fields that provide information such as identifiers associated with target BS 114, the traffic channels allocated by BS 114 to the mobile station, and one or more of a control channel and access channel associated with the BS 114. For example, the resource response message may comprise a modified version of a legacy network STATUS REQUEST message, which message is modified to include the modified UHDM.

In response to receiving the resource response message, BS 134 informs 610 mobile station 102 of the traffic channels allocated to the mobile station in air interface 132. Preferably, BS 134 informs mobile station 102 of the allocated traffic channels by parsing the resource response message to retrieve the handoff direction message (for example, the modified UHDM), and then encapsulating the handoff direction message in a HRPD network message, for example, encapsulating the UHDM message as the payload in an HRPD data burst message that is conveyed via a dedicated forward link traffic channel of air interface 132 or encapsulating the UHDM message in a control message that is conveyed via a forward link control channel of air interface 132. In response to receiving the HRPD network message from BS 134, mobile station 102 parses the message, recognizes the UHDM message, and identifies the traffic channels allocated to the mobile station in air interface 132 based on the UHDM message. Mobile station 102 then attempts to acquire the identified traffic channels in accordance with well-known channel acquisition techniques.

Upon successfully acquiring the traffic channels, mobile station 102 informs 612 BS 114 that the mobile station has successfully acquiring the traffic channels allocated at BS 134, preferably by conveying a handoff complete message. In addition, at some point in time after mobile station 102 has successfully acquired the traffic channels allocated at BS 114, BS 134 releases (616, 619, 632) the resources allocated by the BS to mobile station 102. Similar to the release of resources described herein in greater detail with respect to signal flow diagram 200 and BS 114, the release of the resources allocated by BS 134 to mobile station 102 may be timer-based (614, 616), that is, based on a release timer, TR, associated with, and located in, BS 134, may be based on information received from BS 114 (618, 619), such as a RESOURCE RELEASE message conveyed by BS 114 to BS 134, or may be based on information conveyed to BS 134 by PDSN 124 (624, 628, 630).

For example and similar to the release procedure described with respect to signal flow diagram 400 above, when BS 134 informs mobile station 102 of the traffic channels allocated to the mobile station in air interface 132 (at 610), BS 134 may start release timer $T_R$. The release timer is used by BS 134 to determine when to release the resources, such as RF resources in air interface 132 and signal processing resources in BTS 136, allocated by the BS to mobile station 102. As a result, the release timer counts down a quantity of time that is predetermined to be sufficient for a hybrid mobile station, such as mobile station 102, to successfully acquire traffic channels allocated to the mobile station by a BS other than BS 134 as part of an inter-technology handoff. In response to an expiration of release timer $T_R$, BS 134 releases 616 the resources allocated by the BS to mobile station 102.

By way of another example, when BS 114 is informed 612 by mobile station 102 that the mobile station has successfully acquiring the allocated traffic channels at the BS, BS 114 then informs 618 BS 134 of a successful handoff, preferably by conveying a RESOURCE RELEASE message to BS 134. In response to being informed of the successful handoff, BS 134 releases 619 the resources allocated by BS 134 to mobile station 102.

By way of yet another example, in response to receiving (at 620) a REGISTRATION REQUEST message from BS 114, PDSN 124 may convey 624 a REGISTRATION UPDATE message to BS 134. In response to receiving the REGISTRATION UPDATE message, BS 134 may convey 628 a REGISTRATION REQUEST message to the PDSN. In response to receiving the REGISTRATION REQUEST message, PDSN 124 may convey 630 a REGISTRATION REPLY message to BS 134. In response to receiving the REGISTRATION REPLY message, BS 134 may release the resources allocated to mobile station 102. BS 134 may further acknowledge 626 the REGISTRATION UPDATE message, for example by conveying a REGISTRATION ACK message back to the PDSN.

Further, in response to being informed (at 612) that mobile station 102 has successfully acquired the traffic channels allocated at BS 114, BS 114 completes the establishment of a bearer path for mobile station 102 in HRPD network 130 by registering the mobile station with PDSN 124 and setting up a new tunnel to the PDSN. Preferably, BS 114 registers the mobile station and sets up a new tunnel by conveying 620 an A11 REGISTRATION REQUEST message to the PDSN. In response to receiving the A11 REGISTRATION REQUEST, PDSN 124 allocates a connection to BS 114 and informs the BS of the allocated connection, preferably by conveying 622 an A11 REGISTRATION REPLY to the BS. The establishment of communication session between PDSN 124 and mobile station 102 via BS 114 is then completed 634 in accordance with well-known techniques.

In a sixth embodiment of the present invention, a handoff of mobile station 102 from HRPD network 130 to legacy network 110 also may controlled by MSC 120. Referring now to FIG. 7, a signal flow diagram 700 is provided that depicts a handoff executed by communication system 100 in handing off a communication session from HRPD network 130 to legacy network 110 in accordance with the sixth embodiment of the present invention. Signal flow diagram 500 begins when mobile station 102 is actively engaged 702, 703 in a communication session with a distant party via HRPD network 130. At this point in time, mobile station 102 is already registered with the HRPD network. As part of the communication session, mobile station 102 conveys 702 reverse link frames comprising bearer traffic to PDSN 124 via a reverse link traffic channel of air interface 132, BS 134, and IP network 122 for routing to the distant party via an external network (not shown). Further, when PDSN 124 receives bearer traffic from the distant party and intended for mobile station 102; the PDSN routes 703 the voice information to BS 134 via IP network 122 and the BS conveys forward link frames comprising the bearer traffic to mobile station 102 via a forward link traffic channel of air interface 132. At this point in time, mobile station 102 is further registered with the legacy network and monitors pilot channels associated with base stations other than BS 134, such as BS 114.

At some point in time during the course of the communication session, BS 134 receives 604 a handoff trigger message indicating a need or desire to handoff mobile station 102. Such handoff trigger messages are described in greater detail above and will not be further described in detail. In response to receiving the handoff trigger message, BS 134 requests 706 the capabilities of mobile station 102 from the mobile station, such as the radio configurations and data rates supported by the mobile station. Preferably, BS 134 requests the capabilities of mobile station 102 by conveying, to the mobile station, a legacy network STATUS REQUEST message via the 3G1X channel of the forward link of air interface 132. In response to the capability request, mobile station 102 conveys 708 its capabilities to BS 134, preferably by conveying a legacy network STATUS RESPONSE message via the 3G1X channel of the reverse link of air interface 132 to the BS.

In response receiving the capabilities of mobile station 102, BS 134 informs 710 MSC 120 that a handoff of mobile station 102 is required, preferably by conveying a HANDOFF REQUIRED message to the MSC. In response to receiving the handoff required message from BS 134, MSC 120 retrieves legacy communication session parameters, such as PDSN IP and mobile capability information, from legacy network 110, and in particular BS 114. However, in a variation of the sixth embodiment, MSC 120 may retrieve the legacy communication session parameters from any legacy network BS. MSC 120 then requests 712 resources, including forward link and reverse link traffic channels in air interface 112, from a legacy BS, that is, BS 114, for a handoff of mobile station 102. Preferably, the resource request comprises an MSC originated HANDOFF REQUEST as is known in the art.

In response to receiving the resource request from MSC 120, BS 114 allocates legacy network resources to the handoff, including a forward link traffic channel and a reverse link traffic channel in air interface 112. BS 114 then conveys 714 an acknowledgement, preferably a HANDOFF REQUEST ACK, to MSC 120 that informs of the allocated resources, including the forward link and reverse link traffic channels allocated in air interface 112. MSC 120 then instructs 716 BS 134 to initiate a handoff of mobile station 102, which instruction further informs of the legacy network resources allocated by BS 114. Preferably, the handoff instruction comprises a modified version of a HANDOFF COMMAND message, which message is modified to include data fields that identify the allocated legacy network resources.

In response to receiving the handoff instruction, BS 134 conveys 718 a message to mobile station 102 that redirects the mobile station to target HRPD network 130 and target BS 134. Preferably, the redirection message comprises a modified version of a Handoff Direction Message (HDM) or an Enhanced Channel Assignment Message (ECAM), which messages are modified to include additional data fields that provide legacy network redirection information, such as identifiers associated with target BS 114 and/or one or more of a control channel and access channel associated with the target BS, and to further include some or all of the legacy network resources allocated by BS 114. In addition, BS 134 informs 720 MSC 120 that the handoff has commenced, preferably by conveying a HANDOFF COMMENCED message to the MSC.

In response to receiving the redirection message from BS 134, mobile station 102 identifies the traffic channels allocated to the mobile station in air interface 112. Mobile station 102 then attempts to acquire the identified traffic channels in accordance with well-known channel acquisition techniques. Upon successfully acquiring the traffic channels, mobile station 102 informs 722 BS 114 that the mobile station has successfully acquired the traffic channels allocated at BS 114 and that the handoff is complete, preferably by conveying a BS ACK_ORDER message to the BS. In response to being informed that mobile station 102 has successfully acquired the traffic channels allocated at BS 114, BS 114 informs MSC 120 that the handoff is complete, preferably by conveying a HANDOFF COMPLETE message to the MSC. In addition, BS 114 completes 728 the establishment of a bearer path for mobile station 102 in legacy network 110 by registering the mobile station with PDSN 124 and setting up a new tunnel to the PDSN. Preferably, BS 114 registers the mobile station and sets up a new tunnel by conveying an A11 REGISTRATION REQUEST message to the PDSN. In response to receiving the A11 REGISTRATION REQUEST, PDSN 124 allocates a connection to BS 114 and informs the BS of the allocated connection, preferably by conveying an A11 REGISTRATION REPLY to the BS. The establishment of communication session between PDSN 124 and mobile station 102 via BS 114 is then completed 734 in accordance with well-known techniques.

At some point in time after mobile station 102 has successfully acquired the traffic channels allocated at BS 114, and preferably after BS 114 further completes 728 the establishment of a bearer path for mobile station 102 in legacy network 110, BS 134 releases 730, 732 the resources allocated to mobile station 102 in legacy network 110. For example, as described above in greater detail, the release 730 of the resources allocated by BS 134 to mobile station 102 may be timer-based or may be based upon an exchange of messages, pursuant to well known HRPD resource release protocols, between BS 134 and the mobile station after the mobile station has successfully acquired the traffic channels allocated at BS 134.

BS 134 and PDSN 124 further arrange 732 for the release of resources allocated to mobile station 102 between the BS and PDSN in accordance with well known HRPD resource release protocols. For example, in response to receiving an A11 REGISTRATION REQUEST, PDSN 124 may instruct BS 134 to request an update of registration information concerning mobile station 102, for example, by conveying a REGISTRATION UPDATE message to the BS that further identifies mobile station 102. In response to receiving the REGISTRATION UPDATE message, BS 134 may request updated registration information from PDSN 124 for mobile station 102, for example, by conveying a REGISTRATION REQUEST message to PDSN 124. In response to receiving the request for updated registration information for mobile station 102, PDSN 124 may inform BS 134 of the successful handoff of the mobile station to BS 114, for example, by conveying a REGISTRATION REPLY message to BS 134. If BS 134 has not yet released the resources allocated by BS 114 to mobile station 102, BS 114 may now release such resources.

Thus communication system 100 further provides for a handoff of hybrid mobile station 102 from HRPD network 130 to legacy, or non-HRPD, network 110 by encapsulating a legacy network message in an HRPD network message or by use of a redirection message. In one embodiment of the present invention, HRPD network 130 receives a handoff trigger and, in response to receiving the handoff trigger, requests an allocation of legacy network RF resources from legacy network 110. In response to the receiving the request, legacy network 110 allocates RF resources to mobile station 102 and informs HRPD network 130 of the allocated RF resources via a legacy network message. HRPD network 130 then informs mobile station 102 of the allocated legacy network RF resources by encapsulating the legacy network message in an HRPD network message. Based on the allocated HRPD RF resources, mobile station 102 then establishes a traffic channel with legacy network 110. Subsequent to the establishment of the traffic channel, HRPD network 130 releases HRPD network RF resources associated with the mobile station. The release may be timer-based or may be based on a message received by HRPD network 130 from legacy base station 114 or from PDSN 124. In another embodiment of the present invention, the handoff may be controlled by MSC 120 and inform mobile station 102 of the allocated legacy network RF resources by use of a redirection message.

While the present invention has been particularly shown and described with reference to particular embodiments thereof, it will be understood by those skilled in the art that various changes may be made and equivalents substituted for elements thereof without departing from the scope of the invention as set forth in the claims below. Furthermore, one of ordinary skill in the art realizes that the components and operations of the transmitting communication device and receiving communication device detailed herein are not intended to be exhaustive but are merely provided to enhance an understanding and appreciation for the inventive principles and advantages of the present invention, rather than to limit in any manner the invention. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for a handoff of a hybrid mobile station from a network implementing a non-high rate packet data (non-HRPD) communication technology to a network implementing a high rate packet data (HRPD) communication technology, the method comprising:

conveying forward link bearer traffic to, and receiving reverse link bearer traffic from, the mobile station via radio frequency (RF) resources associated with the non-HRPD network;

receiving, by the non-HRPD network, a handoff trigger;

in response to receiving the handoff trigger, conveying a message by the non-HRPD network to the mobile station that redirects the mobile station to the HRPD network;

receiving, by the HRPD network from the mobile station and in response to the conveyance of the redirection message, a connection request;

in response to receiving the connection request, conveying, by HRPD network to the mobile station, an allocation of HRPD network resources;

establishing, by the HRPD network, a traffic channel with the mobile station based on the allocated HRPD network resources; and subsequent to the establishment by the HRPD network of a traffic channel with the mobile station, releasing, by the non-HRPD network, the RF resources of the non-HRPD network.

2. The method of claim 1, wherein releasing comprises:

when conveying the redirection message to the mobile station, starting a timer by the non-high rate packet data (non-HRPD) network; and upon expiration of the timer, releasing the non-HRPD radio frequency resources by the non-HRPD network.

3. The method of claim 1, wherein releasing comprises:

receiving, by the non-high rate packet data (non-HRPD) network from the high rate packet data network, a message informing of a successful handoff; and in response to being informed of the successful handoff, releasing the non-HRPD radio frequency resources by the non-HRPD network.

4. The method of claim 1, wherein releasing comprises:

receiving, by the non-high rate packet data (non-HRPD) network from a Packet Data Serving Node, a message informing of a successful handoff; and in response to being informed of the successful handoff, releasing the non-HRPD radio frequency resources by the non-HRPD network.

5. A system for a handoff of a hybrid mobile station from a network implementing a non-high rate packet data (non-HRPD) communication technology to a network implementing a high rate packet data (HRPD) communication technology, the system comprising:

a non-HRPD base station configured to convey forward link bearer traffic to, and receiving reverse link bearer traffic from, the mobile station via radio frequency (RF) resources associated with the non-HRPD network, receive a handoff trigger; in response to receiving the handoff trigger, convey a message to the mobile station that redirects the mobile station to a HRPD base station, and release the non-HRPD network RF resources subsequent to an establishment of a traffic channel with the mobile station by an HRPD base station; and a HRPD base station in communication with the non-HRPD base station and that is configured to receive a connection request in response to the conveyance by the non-HRPD base station of the redirection message, in response to receiving the connection request, convey to the mobile station an allocation of HRPD network resources and establish a traffic channel with the mobile station based on the allocated HRPD network resources.

6. The system of claim 5, wherein the non-high rate packet data (non-HRPD) base station is further configured to, when conveying the redirection message to the mobile station, start a timer and to release the non-HRPD radio frequency resources upon expiration of the timer.

7. The system of claim 5, wherein the high rate packet data (HRPD) base station is further configured to, in response to establishing a traffic channel with the mobile station, convey a message informing of a successful handoff and wherein the non-high rate packet data (non-HRPD) base station is further configured to receive the message informing of a successful handoff and, in response to receiving the message informing of the successful handoff, release the non-HRPD radio frequency resources.

8. The system of claim 5, further comprising a Packet Data Serving Node (PDSN) in communication with each of the non-high rate packet data (non-HRPD) base station and the high rate packet data (HRPD) base station, wherein the HRPD base station is further configured to, in response to establishing a traffic channel with the mobile station, inform the PDSN of a successful handoff, wherein the PDSN is configured to, in response to being informed by the HRPD base station of the successful handoff, inform the non-HRPD base station of the successful handoff, and wherein the non-HRPD base station is further configured to, in response to being informed by the PDSN of the successful handoff, release the non-HRPD radio frequency resources.

* * * * *